United States Patent
Izawa

[11] 3,880,630
[45] Apr. 29, 1975

[54] METHOD FOR FORMING OPTICAL WAVEGUIDES

[75] Inventor: Tatsuo Izawa, Tokyo, Japan

[73] Assignee: Nippon Telegraph and Telephone Public Corporation, Tokyo, Japan

[22] Filed: Nov. 30, 1972

[21] Appl. No.: 310,697

[30] Foreign Application Priority Data
Dec. 1, 1971    Japan.................................. 46-96936

[52] U.S. Cl. .......................... 65/30; 65/60; 65/111; 65/DIG. 7
[51] Int. Cl. ............................................. C03c 21/00
[58] Field of Search ......... 65/30, 3, 60, 111, DIG. 7

[56] References Cited
UNITED STATES PATENTS
3,542,536    11/1970    Flam et al.............................. 65/111
3,563,057    2/1971    Rosenbauer ............................ 65/30
3,647,406    3/1972    Fisher ...................................... 65/30
3,681,041    8/1972    D'Huart.................................. 65/30

*Primary Examiner*—S. Leon Bashore
*Assistant Examiner*—Kenneth M. Schor

[57] ABSTRACT

A method of forming optical waveguides is provided which comprises a step of forming an opaque mask having a transparent channel corresponding to an optical transmission line to be formed upon one major surface of a dielectric substrate, and diffusing the ions having large electronic polarizability per unit volume in electric field and then diffusing the ions having small electronic polarizability into said dielectric substrate by the electrically induced migration, thereby forming a localized high refractive index portion corresponding to said transparent channel at the desired depth in said substrate.

4 Claims, 11 Drawing Figures

MASKING

SECOND STEP DIFFUSION

FIRST STEP DIFFUSION

PHOTO ECHING

METHOD FOR FORMING OPTICAL WAVEGUIDES

BACKGROUND OF THE INVENTION

The present invention relates generally to a method for forming optical waveguides suited for optical integrated circuits or optical waveguide components and more particularly a method for forming in a dielectric substrate optical transmission lines or cores having a higher refractive index than the dielectric substrate.

In general optical waveguides comprise an optical transmission core having relatively high refractive index clad to a medium having relatively low refractive index. There have been devised and demonstrated various methods for forming optical transmission lines or cores.

According to one prior art method, upon one major surface of the substrate of a first optical dielectric material is formed a thin film of a second optical dielectric material such as glass, plastics, metal oxides having a refractive index higher than the first dielectric material by radio frequency sputtering, vacuum deposition or the like. Thereafter the thin film is removed by the photoetching method according to a predetermined pattern. The remaining thin film on the substrate serves as an optical transmission core. According to another prior art method, a dielectric substrate is immersed in a molten metal or metallic salt bath so as to diffuse the metallic ions into the substrate thereby forming at the surface a localized portion having high refractive index which serves as an optical transmission core. The above two methods are fully described by J. E. Goell et al. Bell System Technical Journal vol. 48, p. 3445–3448, 1969 and H. Osterberg et al. Journal of Optical Society of America vol. 54, p. 1078–1084, 1964.

According to another prior art method for forming optical waveguides, a dielectric substrate is irradiated with a high-speed ion beam of He, Li, C, P, Xe and Tl and Bi so as to increase the refractive index of an interior localized region. Opposed to the optical waveguides formed by the two prior methods described above, the transmission cores formed by this method has a smaller scattering loss because the core made by proton (He) bombardment is buried in the substrate but it is difficult to bury the core with Li or larger atoms so the loss of the guide does not become small and, the optical transmission core formed is thermally instable because the refractive index is increased due to the distortion of the substrate caused by the implated ions. This method is explained in the U.S. Pat. No. 3,542,536, entitled "Method of Forming Optical Waveguide by Irradiation of Dielectric Material."

The feature common both in the above prior art methods is that the optical transmission core having higher refractive index is formed upon the major surface of the substrate. Therefore it is difficult to avoid the scattering losses resulting from the imperfection of the order of the transmitted wavelength of the surface of the substrate or the interface of core and clading. Furthermore since an optical transmission core of higher refractive index is formed at the surface of a substrate, prism or grating couplers must be attached to the input and output ends of the optical waveguide. The above prism and grating couplers are described by P. K. Tien et al. Journal of Optical Society of America vol. 60, No. 10, 1970, p. 1325–1377 and by M. L. Dakss et al. Applied Physics Letters, vol. 16, No. 12, 1970, p. 523–525.

THE SUMMARY OF THE INVENTION

One of the objects of the present invention is therefore to provide new methods for forming optical waveguides which have a minimum scattering loss and are thermally stable.

Another object of the present invention is to provide a method for forming the waveguide in interior localized regions of a dielectric substrate by double diffusion of ions.

In accordance with the invention there is disclosed a method of fabricating an optical waveguide comprising, the step of providing a single continuous quantity of solid optical dielectric material, and the first diffusion step of changing the refractive index in a localized region of or a surface of said dielectric material by diffusing by an electric field the ions with large electronic polarizability per unit volume so as to produce a localized region of higher refractive index than the remainder of said material and the second diffusion step of migrating said region of higher refractive index region to the desired depth in said dielectric material by diffusing by an electric field only the ions with small electronic polarizability per unit volume so as produce a localized region of lower refractive index at the localized region made by said first diffusion step.

The above and other objects, features and advantages of the present invention will become more apparent from the following description of some preferred embodiments thereof taken in conjunction with the accompanying drawing.

DESCRIPTION OF THE PREFERRED EMBODIMENT

Figure 1:
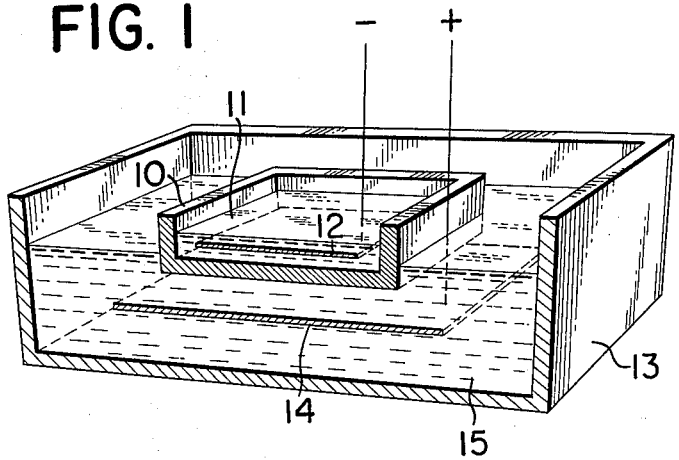
FIG. 1 is a schematic perspective view used for the explanation of a first embodiment of the present invention.

Since the refractive index of a dielectric material such as glass is generally dependent upon the electronic polarizability per unit volume of the ions in the dielectric material, the refractive index may be changed by changing the ion concentration. In order to change the composition of a localized region of glass, the diffusion method has been generally employed. The ion concentration profile (which is substantially similar to the refractive index distribution curve) obtained by diffusion is given by the complementary error-function distribution or the gaussian distribution so that it is extremely difficult to select a desired ion concentration profile or refractive index profile. Furthermore the scattering loss of an optical waveguide fabricated by only one diffusion step is too high for practical use as in the case of the second prior art method described above. In order to decrease the scattering loss, it is preferable that a high refractive index region is located beneath the surface of a substrate and that the change in refractive index along the boundary between the core and the cladding is not so steep as in case where the core is formed on a substrate.

According to the present invention two kinds of ions are diffused into a dielectric substrate in the electric field in order to form a waveguide located beneath the surface of substrate. When the ions are diffused from the surface of a dielectric substrate in the electric field, the ion concentration profile or distribution F(x) is given by $$F(x) = A_0 erfc \left( \frac{x - E\mu t}{2\sqrt{Dt}} \right) \quad (1)$$

where
- $A_0$ = the constant of proportionality to be determined depending upon the composition of a dielectric substrate and the composition of a diffusion ion source;
- $E$ = the applied electric field;
- $\mu$ = the mobility of ions;
- $t$ = time;
- $D$ = the diffusion constant of ions; and
- $erfc (x - E\mu t)/2\sqrt{Dt}$ = the complementary error-function.

From Eq. (1) it is seen that ions move in one direction and the ion concentration profile may be varied depending upon the applied electric field, the temperature (the change of which causes the change in $D$ and $\mu$) and the diffusion time. When the condition $$E\mu t >> \sqrt{Dt}$$

is satisfied (This condition being satisfied when the intensity of field $E$ is a few V/mm), the concentration profile is rectangular and the concentration is gradually changed at the boundary of the diffused layer. It should be noted that the concentration profile given by Eq. (1) is substantially equal to the refractive index distribution.

After the fast diffusion, the second ions are diffused by electric field to an migrate to interior region and to form a localized region of lower refractive index. The concentration profile of the second ions is similar to the profile made by the first diffusion, but shifted to the interior of the dielectric material.

According to the present invention the ions having larger electronic polarizability per unit volume are diffused in electric field from the surface of a dielectric substrate so as to form an interior localized region having larger refractive index in the dielectric substrate. Thereafter the ions having a relatively low electronic polarizability per unit volume which form an interior localized region having a relatively low refractive index are diffused. Under the influence of electric field the ions which have been first diffused into the dielectric substrate are migrated further into the interior whereas the ions which are diffused by the second diffusion step are concentrated in the localized region in which the first ions were once concentrated in the first diffusion step. Thus a localized high refractive index portion or core is formed within the substrate at the desired depth beneath the surface.

Since the ions move in one direction (from the positive electrode to the negative electrode) in the electric field, the ion concentration profile obtained by the first diffusion step remains unchanged even in the second diffusion step. If the electric field is not applied in the second diffusion step, the ions diffused in the first step diverge and it is difficult to get waveguides with the desired index profile. Furthermore the intensity of field of the order of 1–100 V/mm is sufficient enough to satisfy the condition $$E\mu t >> \sqrt{Dt}$$

so that the method in accordance with the present invention may change the composition of a dielectric substrate such as glass within a shorter time than the prior method in which the ion diffusion is effected without the electric field. For example the time required for forming a high refractive index core or layer 100 $\mu$ in width by the first diffusion step described above is approximately 50 minutes whereas the formation of a similar core or layer takes about 50 hours by diffusion method without the electric field. Furthermore by cycling the first and second diffusion steps described above many times on the same dielectric substrate there may be formed a plurality of optical waveguides in the form of a multi-layer.

The table below shows the relation between the radius and electronic polarizability of various ions.

| Ion | Radius in A | Electronic polarizability in A³ |
|-----|-------------|-------------------------------|
| Li⁺ | 0.78 | 0.03 |
| Na⁺ | 0.95 | 0.41 |
| K⁺ | 1.33 | 1.33 |
| Rb⁺ | 1.49 | 1.98 |
| Cs⁺ | 1.65 | 3.34 |
| Tl⁺ | 1.49 | 5.20 |

In the method in accordance with the present invention thallium, lead, tin, barium or silver ions are preferably used as first ions to be diffused into the dielectric substrate from the surface thereof in the first step, and lithium, sodium, potassium, rubidium or cesium ions may be used as second ions to be diffused into the substrate in the second diffusion step.

The above and other objects, features and advantages of the present invention will become more apparent from the following description of some preferred embodiments thereof taken in conjunction with the accompanying drawing.

DESCRIPTION OF THE PREFERRED EMBODIMENTS

Referring to FIG. 1, a dielectric substrate 10 is generally made of a glass (for example 50 × 50 × 10 mm) consisting of 73 percent by weight of $SiO_2$, 10 percent by weight of $B_2O_3$, 0.9 percent by weight of $Na_2O$ and 8 percent by weight of $K_2O$. A shallow recess approximately 8 mm in depth is formed in the surface of the substrate 10 by any suitable method such as ultrasonic machining or press. Potassium nitrate 11 and a platinum electrode 12 are placed in the recess, and the substrate 10 is in turn placed in a salt bath 15 in a vessel 13 made of a refractory material such as ceramic. Another platinum electrode 14 is also placed in the salt bath 15.

The composition of the substrate glass 10 is not particularly limited as long as it contains about 5 percent by weight of $K_2O$ and $Na_2O$. For example the substrate glass 10 may be silicate glass, borosilicate glass or phosphate glass. The salt bath 15 contains ions to be diffused and consists of 49 percent by weight of $KNO_3$, 49 percent by weight of $NaNO_3$ and 2 percent of $TlNO_3$. The vessel 13 is placed in an electric furnace which maintains a temperature below the softening point of the substrate glass 10, and DC voltage is applied across the electrodes 12 and 14, the former being the negative electrode whereas the latter, the positive electrode. The ratios of $K^+$ and $Na^+$ contained in the salt bath 15 are made equal to those in the substrate glass 10. Then $Tl^+$ ions move toward the negative electrode 12 so that they are diffused into the substrate glass 10. $K^+$ and $Na^+$ ions also move toward the electrode 12 so that they are diffused into the substrate glass, but those in the substrate glass 10 move toward and are educed into the molten potassium nitrate so that the ratios of these ions $K^+$ and $Na^+$ in the substrate glass 10 remain unchanged. The above process will be referred to as "the first diffusion step" in this specification. By the first diffusion step $Tl^+$ ions are diffused into the substrate glass 10 to the desired width $W$, and thereafter the composition of the fused salt bath 15 is changed so as to remove $Tl^+$ ions and have the same alkali ion ratio with that of the substrate glass 10. (For example $KNO_3$ and $NaNO_3$ are mixed at the ratio of 1 : 1.) The above process will be referred to as "the second diffusion step" in this specification. By the second diffusion step $Tl^+$ ions diffused at the surface of the substrate glass 10 are further migrated into the interior, whereas $K^+$ and $Na^+$ ions are simultaneously diffused below the surface of the substrate glass 10 so that the latter has the initial composition.

Since the electronic polarizability of $Tl^+$ ions per unit volume is higher than those of $Na^+$ and $K^+$ ions, the localized portion of the substrate glass 10 in which $Tl^+$ ions are diffused has a refractive index higher than that of the remaining portion. It is this localized portion diffused with $Tl^+$ ions having a relatively high refractive index that is used as a core for the optical waveguide.

Figure 2A:
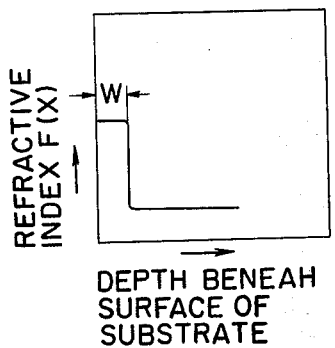
FIG. 2A and 2B are graphs illustrating the refractive index distribution in a dielectric substrate obtained by a first and second diffusion steps, respectively.
Figure 2B:
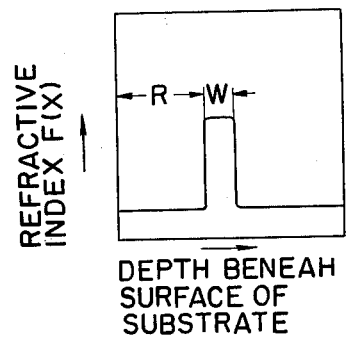

FIG. 2A shows the refractive index distribution of the substrate glass 10 after the first diffusion step and FIG. 2B, that of the substrate glass after the second diffusion step. The distance from the surface is plotted along the abscissa whereas the refractive index, along the ordinate. As explained above, the refractive index distribution curve corresponds to the ion concentration distribution $F(x)$. The width $w$ of the higher refractive index portion containing $Tl^+$ ions is dependent upon the time required for treating the first diffusion step, and the distance $R$ from the surface of the substrate glass 10 to the localized region having a high refractive index is dependent upon the second diffusion time.

Figure 3:
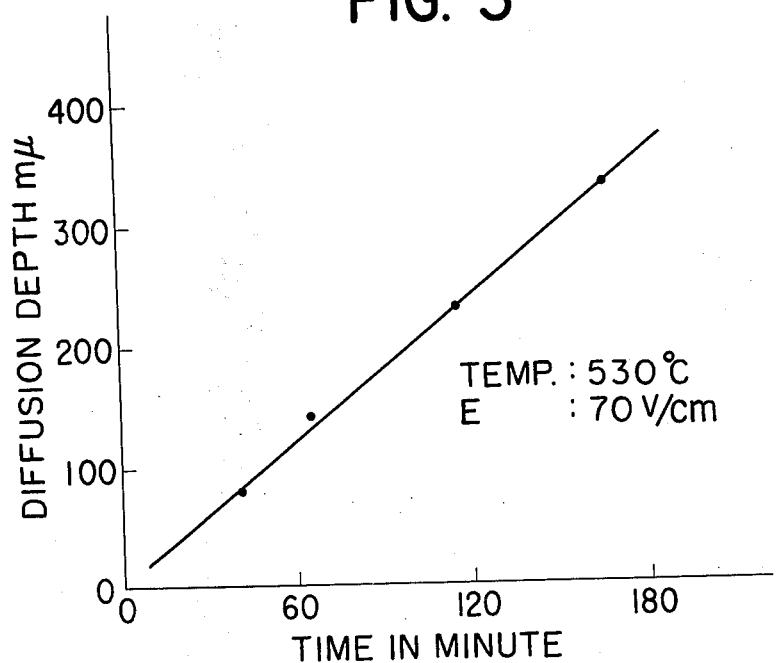
FIG. 3 is a graph illustrating the relation between the diffusion time and the diffusion depth when thallium ions are used.

FIG. 3 shows the relation between the diffusion time of $Tl^+$ ion in minutes and the diffusion depth in $\mu m$. From this graph one may obtain the time required for the desired $R$ and $W$.

Referring back to FIGS. 2A and 2B, when the first and second diffusion steps are carried out at a relatively low temperature (for example at 350°C) in the relatively high electric field (for example 20 V/mm), the rectangular high refractive index portion or layer having steep boundary may be formed. The curve defining these boundary may be obtained from Eq. (1) discussed above and is dependent upon $E\mu t$ and $\sqrt{Dt}$.

Figure 4:
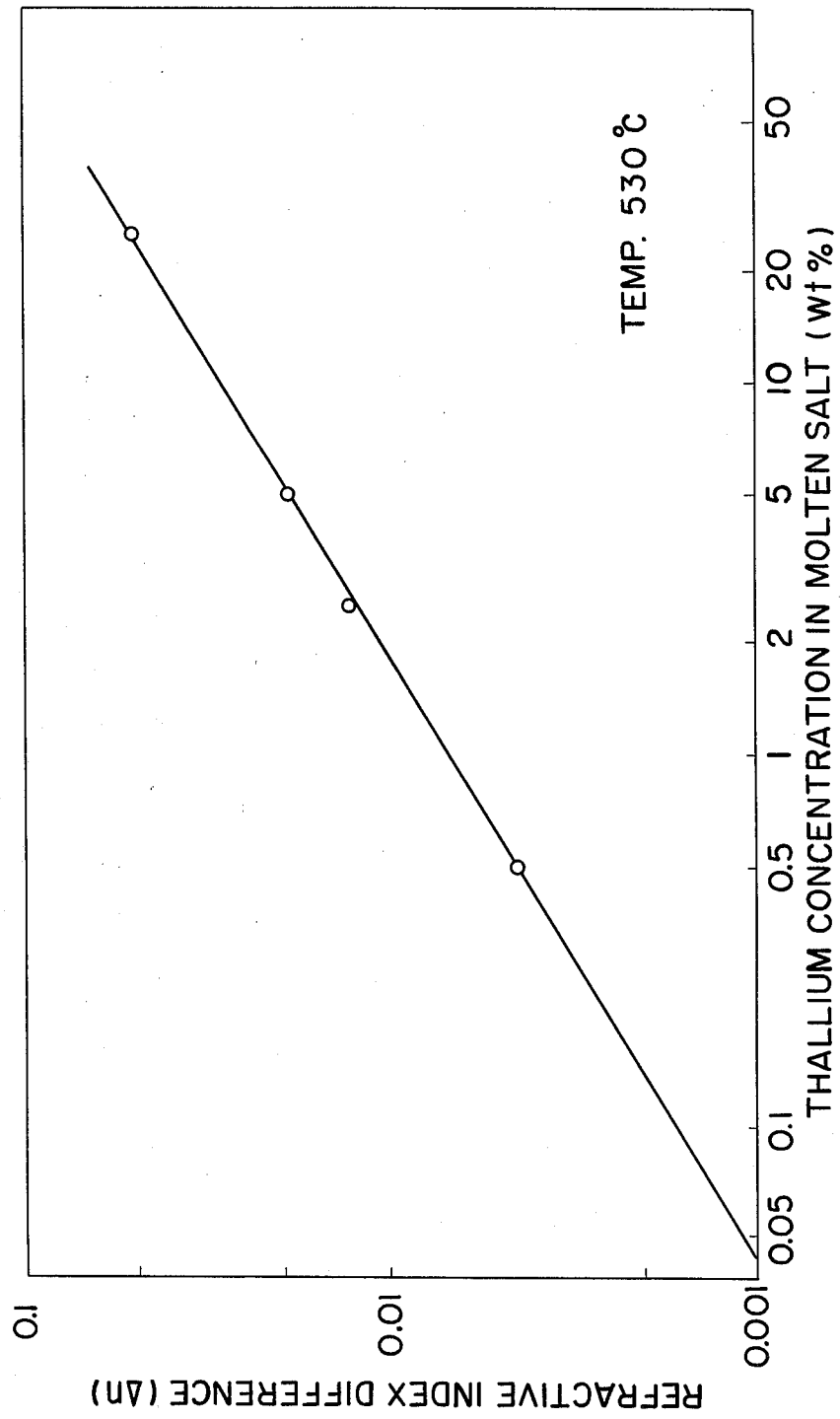
FIG. 4 is a graph illustrating the relation between the ratio of $TlNO_3$ in a fused or molten bath consisting of $KNO_3$ and $NaNO_3$ and the refractive index difference between the optical core and the substrate.

The difference in refractive index between the substrate glass and a high refractive index portion formed by the first diffusion step described above may be varied in the range between 0.001 and 0.1 depending upon the compositions of the substrate 10 and molten salts bath 15. FIG. 4 is a graph illustrating the relation between the thallium nitrate in percent by weight in the molten salt bath consisting of thallium nitrate, potassium nitrate and sodium nitrate, and the refractive index difference. It is seen that the refractive index difference may be varied in the range from 0.001 to 0.1 as the concentration of thallium nitrate in the molten salts bath 15 is varied from 0.05 to 50 percent. Therefore the width of a high refractive index portion may be freely selected. Furthermore the cross section of a high refractive index portion may be arbitrarily selected by changing the configurations of the electrodes used, the temperature, the voltage applied the electrodes and the diffusion time. So far the substrate has been described as being a glass plate, but it will be understood that any other suitable dielectric material such as crystal may be used as a substrate.

Figure 5:
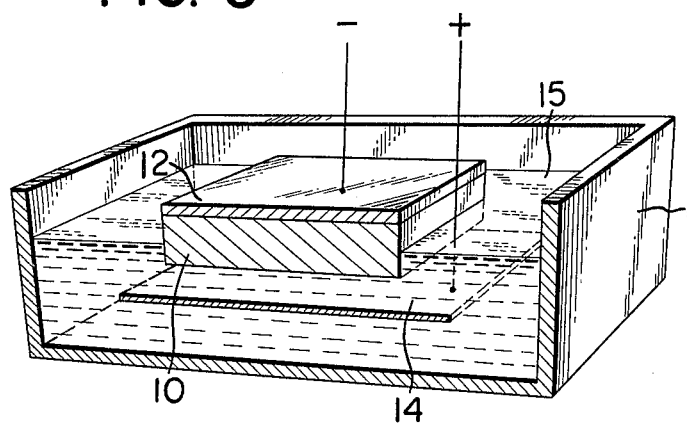
FIGS. 5 and 6 are schematic views used for the explanation of a second and third embodiments of the present invention.

Referring to FIG. 5, the second embodiment of the present invention will be described. Upon one major surface of the substrate glass 10 is formed the metal layer 12 by the vacuum deposition of platinum, chrominum or nickel. The metal layer 12 serves as a negative electrode 12 in the first embodiment. The substrate 10 is placed in the molten salts bath 15 in the vessel 13, and the platinum electrode 14 placed in the molten salts bath 15 serves as a positive electrode as in the case of the first embodiment. The molten salts bath 15 which contains the ions to be diffused into the substrate glass 10 consists of for example 49 percent by weight of $KNO_3$, 49 percent by weight of $NaNO_3$ and 2 percent by weight of $TlNO_3$. The vessel 13 is placed in the electric furnace which maintains the diffusion system at a temperature below the softening temperature of the glass (for example 400°C), and DC voltage is applied across the electrodes 12 and 14. In the first diffusion step, Tl ions are diffused into the substrate 10 from the undersurface thereof and form a localized high refractive index portion, and $K^+$ and $Na^+$ ions are educed into the metal layer electrode 12. In the second diffusion step, the composition of the molten salt bath 15 is changed so as to remove the Tl ions and to have the same alkali ion ratio with that of the substrate glass 10. (For example $KNO_3$ and $NANO_3$ are mixed with ratio of 1 : 1.) The high refractive index portion formed the undersurface of the glass substrate 10 by the first diffusion step is migrated into interior of the glass substrate 10.

Figure 6:
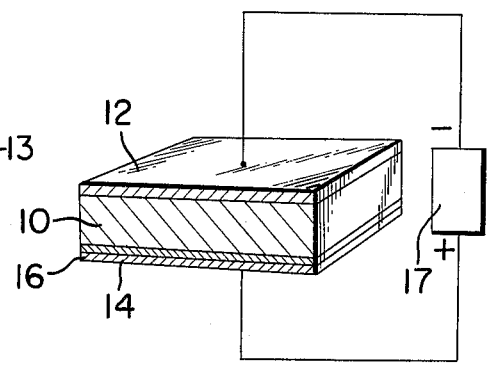

In the third embodiment shown in FIG. 6, instead of the fused or molten salt bath containing the ions to be diffused into a dielectric substrate, a solid dielectric containing ions to be diffused is used. As in the case of the second embodiment described above with reference to FIG. 5, the metal layer 12 which serves as a negative electrode is formed upon the upper major surface of the glass substrate 10. In the first diffusion step a glass layer 16 consisting of 96 percent by mol of Boron oxide ($B_2O_3$), 3 percent by mol of sodium oxide ($Na_2O$), 3 percent by mol potassium oxide ($K_2O$) and 4 percent by mol of thallium oxide ($Tl_2O$) is formed on the undersurface of the glass substrate 10 and this glass acts as the diffusion ion source. Thereafter the metal electrode 14 is formed by vacuum deposition. DC voltage (1–100 V/mm) is applied across the electrodes 12 and 14 from a power source 17 while the diffusion system is maintained at a constant temperature between 550° and 300°C for 10 to 60 minutes. A high refractive index portion is formed by the diffusion of Tl ions into the glass substrate. After Tl ions are diffused into the glass substrate 10 to the desired depth, the electrode 14 and the glass layer 16 are removed by etching. In the second diffusion step, the glass layer 16 consisting of 90 percent by mol of $B_2O_3$, 5 percent by mol of $Na_2O$ and 5 percent by mol of $K_2O$ is formed on the undersurface of the glass substrate 10 by vacuum deposition and the metal electrode 14 is also formed again. As in the case of the first diffusion step, DC voltage is applied across the electrodes 14 and 12 while the diffusion system is maintained at a constant temperature between 550° and 300°C. The high refractive index portion formed beneath the undersurface of the glass substrate 10 is migrate into the interior and the ions $K^+$ and $Na^+$ are diffused from the glass layer 16 into the glass substrate 10 so that the portion beneath the undersurface of the substrate 10 may have the initial composition again. The third embodiment described above is advantageous particularly when a substrate is semi-conductive crystal or dielectric crystal such as a single crystal of CdS. In case of the substrate consisting of a single crystal of CdS selenium ions may be diffused into the substrate in the manner described above.

FIG. 7 shows the steps for fabricating an optical strip waveguide or integrated circuit. First a thin film 18 0.5–1 μm in thickness is formed on the major surface of the substrate 10 from a material such as silicon oxide or aluminum oxide opaque or impermeable to Tl ions by the radio frequency sputtering or chemical vapor deposition. Next a desired circuit pattern is formed on the thin film 18 by removing the thin film 18 by photoetching. Thus transparent channels are formed. The above step will be referred to as a masking step. In the first diffusion step described above, Tl ions are diffused into the substrate 10 through the transparent channels so that high refractive index portions or regions are formed beneath the exposed surface of the substrate 10. In the second diffusion step described above, the high refractive index portions 19 are moved into the interior. When the thin film 18 is removed by chemical etching or a suitable method, the optical strip waveguide or integrated circuit having the desired optical transmission cores 19 may be provided. The thin film 18 may be removed after the first diffusion step. It will be understood that when the similar operations are cycled an optical strip waveguide or integrated circuit having a plurality of optical transmission cores arrayed in the form of a multi-layer may be fabricated.

Figure 8:
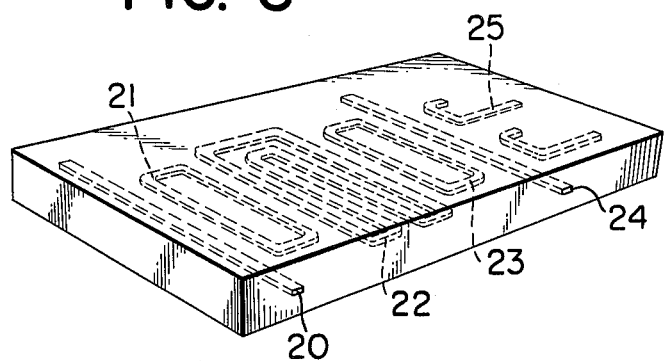
FIGS. 8 and 9 are perspective views of optical integrated circuits fabricated by the method of the present invention.

Another example of an optical strip waveguide or integrated circuit fabricated in accordance with the present invention is shown in FIG. 8. The substrate 10 has an optical input line 20, an oscillation circuit 21, a laser source 22, another oscillation circuit 23, an optical transmission line 24 and a coupler 25. Exciting light transmitted into the input line 20 is applied through the oscillator circuit 21 to the laser source 22 which is an oscillator circuit containing $Nd^{+3}$ ions or the like. Laser light is derived through the oscillator circuit 23 and the line 24 from the coupler 25 and may be branched. The oscillator circuits 21 and 23 are so designed as to oscillate only in response to the exciting and laser light respectively. In summary, in the optical strip waveguide or integrated circuit shown in FIG. 8 when the exciting light is transmitted into the input line 20, the laser light output is derived from the coupler 25.

Figure 9:
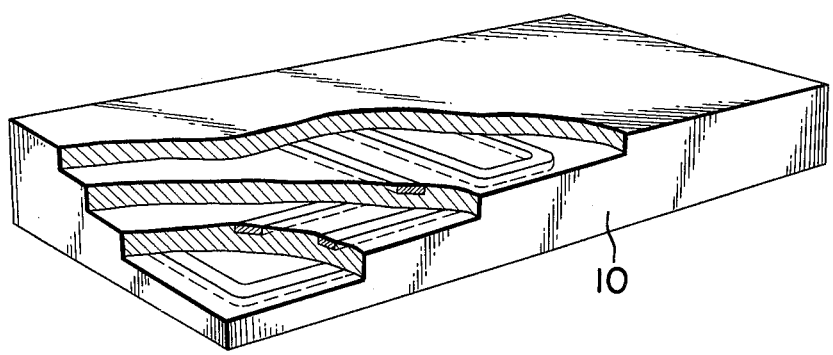
Figure 7A:
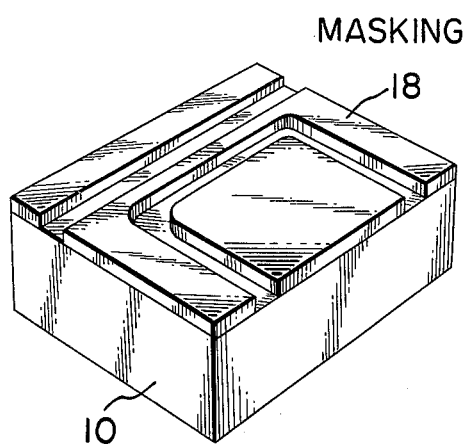
FIGS. 7A and 7B show the steps for forming optical cores in accordance with the present invention.
Figure 7B:
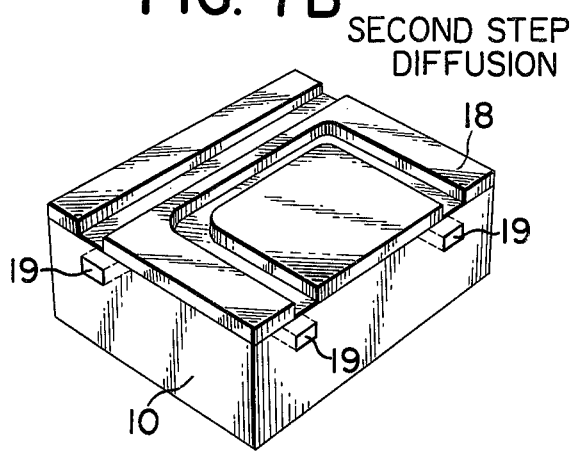
Figure 7B:
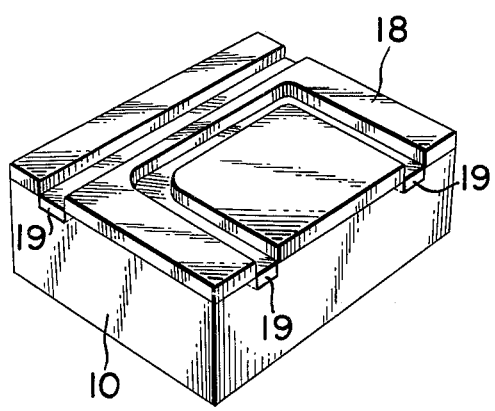
Figure 7B:
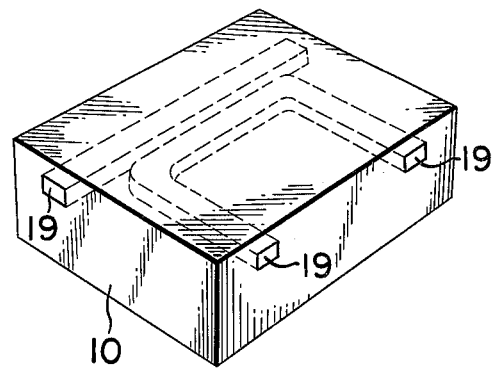

An optical strip waveguide or integrated circuit shown in FIG. 9 is an example having a plurality of optical waveguides 26 formed in accordance with the present invention in a multi-layer form.

What is claimed is:

1. The method of fabricating an optical waveguide comprising;
   the step of providing a substrate of solid optical dielectric material, and
   the step of forming a metal layer on the upper surface of said substrate which serve as a negative electrode, and
   the step of masking the lower surface of said substrate to be diffused by ions with an opaque mask having a transparent channels, and
   the step of providing molten inorganic salts containing the ions with large electronic polarizability and providing a metal plate in said molten salts, and
   the first diffusion step of immersing said substrate in said molten inorganic salts and applying DC voltage between said electrodes so as to produce localized regions of higher refractive index than the remainder of said substrate, and
   the second diffusion step of immersing said substrate in molten inorganic salts containing ions only with small electronic polarizability and applying DC voltage between said electrodes so as to migrate said localized region of higher refractive index to the desired depth in said substrate.

2. The method specified in claim 1 in which said solid optical dielectric material is silicate glass.

3. The method specified in claim 1 in which said opaque mask is the film of $SiO_2$ or $Al_2O_3$.

4. The method specified in claim 1 in which said molten inorganic salts containing large electronic polarizability consist of 49 percent by weight of $KNO_3$, 49 percent by weight of $NaNO_3$ and 2 percent by weight of $TlNO_3$ and said molten inorganic salts containing small electronic polarizability consist of 50 percent by weight of $KNO_3$ and 50 percent by weight of $NaNO_3$.

* * * * *